(12) United States Patent
Allegaert et al.

(10) Patent No.: US 8,329,288 B2
(45) Date of Patent: Dec. 11, 2012

(54) FILM STRUCTURE WITH HIGH OXYGEN BARRIER PROPERTIES AND METHOD FOR MANUFACTURING SUCH A FILM STRUCTURE

(75) Inventors: Rudi Allegaert, Erembodegem (BE); Dirk De Mulder, Kruishoutem (BE)

(73) Assignee: Tekni-Plex Europe, naamloze vennoostschap, Erembodegm (BE)

( * ) Notice: Subject to any disclaimer, the term of this patent is extended or adjusted under 35 U.S.C. 154(b) by 340 days.

(21) Appl. No.: 12/309,036

(22) PCT Filed: Jun. 28, 2007

(86) PCT No.: PCT/BE2007/000069
§ 371 (c)(1),
(2), (4) Date: Jan. 5, 2009

(87) PCT Pub. No.: WO2008/003145
PCT Pub. Date: Jan. 10, 2008

(65) Prior Publication Data
US 2009/0208729 A1 Aug. 20, 2009

(30) Foreign Application Priority Data
Jul. 3, 2006 (BE) .................................. 2006/0360

(51) Int. Cl.
*B32B 27/32* (2006.01)

(52) U.S. Cl. ................ 428/319.9; 428/319.3; 428/319.7
(58) Field of Classification Search ............... 428/319.3, 428/319.7, 319.9
See application file for complete search history.

(56) References Cited

U.S. PATENT DOCUMENTS

| | | | |
|---|---|---|---|
| 4,400,428 A * | 8/1983 | Rosenthal et al. ............ 428/349 |
| 6,221,928 B1 * | 4/2001 | Kozma et al. .................. 521/86 |
| 6,503,587 B2 * | 1/2003 | Kashiba et al. .............. 428/35.7 |
| 2004/0022982 A1 * | 2/2004 | Pandey et al. .............. 428/36.91 |
| 2005/0103740 A1 * | 5/2005 | Itou et al. ........................ 215/41 |

FOREIGN PATENT DOCUMENTS

| | | |
|---|---|---|
| WO | WO 99/02419 A | 1/1999 |
| WO | WO 99/47554 A | 9/1999 |
| WO | WO 00/30846 A | 6/2000 |

* cited by examiner

*Primary Examiner* — Hai Vo
(74) *Attorney, Agent, or Firm* — Rissman Hendricks & Oliverio, LLP

(57) ABSTRACT

Film structure characterized in that it includes at least five layers, two outer layers (2) made of a polyolefin on which is each time provided, on the opposite sides, a layer (4) forming a gas barrier and whereby, between both above-mentioned gas barriers (4), is provided a layer (3) made of a foamed synthetic material, whereby the outer layers (2) consist of a mixture of a polyolefin and a binder, which makes it possible to bond this polyolefin with the layer (4) forming the gas barrier.

11 Claims, 2 Drawing Sheets

Figure 1:
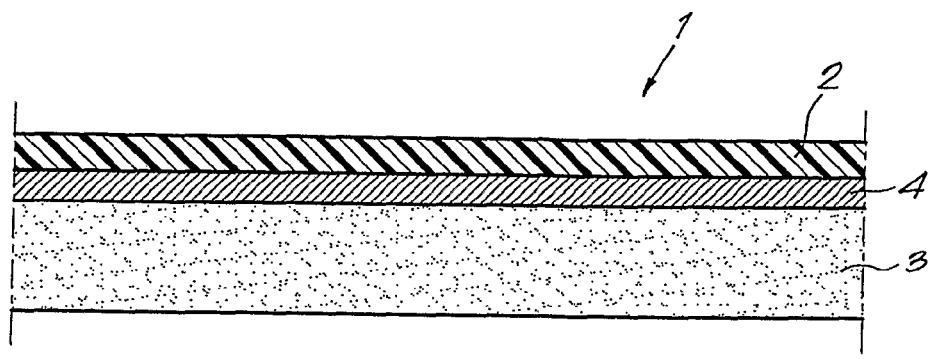

FILM STRUCTURE WITH HIGH OXYGEN BARRIER PROPERTIES AND METHOD FOR MANUFACTURING SUCH A FILM STRUCTURE

The present invention concerns a film structure with high oxygen barrier qualities.

In the packaging industry, film structures having high oxygen barrier qualities are known.

Such film structures are applied for example to seal the neck of a bottle in a leak-tight manner by means of a cap, whereby the film structure is provided in the cap in the form of a slice and is fixed by means of mechanical clamping or possibly by means of an adhesive.

When the cap is applied on the neck of the bottle, it is sealed in a leak-tight manner as the slice is pushed against the neck of the bottle by a turning moment of a screw cap or by pushing the cap on the neck of the bottle.

It is known thereby that such film structures, when they are made of polymers, will let through a certain amount of gas as a function of the thickness of the film structure and the composition of the film structure.

Certain polymers such as for example Polyamide (PA), ethyl vinyl alcohol (EVOH) or polyvinylidene chloride (PVDC) are known for their excellent gas barrier qualities.

These polymers are disadvantageous, however, in that they may be hard and/or brittle and/or sensitive to moisture and/or may have organoleptically unfavourable qualities, such that they are incompatible with a number of products, which makes them unsuitable to be used as a base material and/or a contact material for a film in the packaging industry.

Since such a film structure must have a certain flexibility and elasticity and a certain thickness so as to elastically deform under pressure and to absorb the unevennesses and variations in height of the different parts, in other words the neck of the bottle and the cap, in relation to each other, brittle materials are not suitable.

Such a structure may not crease either (micro-channels) and it must be able to fill micro-channels and scratches on the neck of the bottle when the structure is pressed onto the neck of the bottle.

It is further known that such supple, elastic, thick film structures can be obtained by the use of certain supple, resilient polymers, such as modified polyolefins such as for example Ethyl vinyl acetate (EVA), composed polymers (compounds) better known as Thermoplastic Elastomers (TPE) on the basis of polyolefins and rubberlike polymers, such as for example Styrene-ethylene/butylene-styrene (SEBS) and the like, as well as by the use of thermosets (rubber). The above-mentioned structures are typically solid structures.

It is also known that a supple, elastic, thick structure can be obtained by means of production processes whereby a synthetic material is foamed and provided between two layers. It is the foam layer's task to make the structure supple, easy to compress and resilient and to lower the material cost in relation to Volkern material having the same thickness. Foaming also makes it possible to use more rigid, known and cheap polyolefin materials, such as for example Polyethylene (PE), polypropylene (PP), polybutene (PB), mixtures of such materials or copolymers or terpolymers of such materials.

Such polyolefin materials moreover have excellent moisture barrier and organoleptic qualities compared to for example EVA or the like.

Further, it is known to provide a Volkern film structure with a high oxygen barrier by means of co-extrusion of at least three layers, in particular a first layer (A) of a modified polyolefin, such as for example Ethyl vinyl acetate (EVA); a second layer (B) formed of a modified polyolefin such as for example a Polyethylene co-polymer or a terpolymer with one or several functional groups such as for example Acryl esters and/or maleic anhydrides and the like, whereby this second layer is a binding layer between non-compatible polymers, such as polyolefin materials and more dipolar synthetic materials such as PA, EVOH and the like; and a third layer (C) made of a material which forms an excellent gas barrier, such as for example EVOH or PA.

The first layer (A) is designed as a contact layer with the neck of the bottle. The third layer (C) is not much used as a product contact layer as it is hard and/or brittle, such that it cannot seal the neck of the bottle well when the slice is compressed. Such a non-symmetrical structure produces an orientation problem during the assembly, however, since every slice must be provided in the cap in a well oriented manner.

Further, EVOH loses its very high oxygen barrier qualities in a humid environment.

For the reasons above, a film structure with a high gas barrier, for example with EVOH, is produced in a symmetrical manner, such that the layers (A) and (B) are repeated in a structure and the structure will look as follows: from the inside to the outside: (A) (B) (C) (B) (A), whereby the structure has a certain thickness of 0.5 to 1 mm and the gas barrier layer (C) has a thickness of some 100 micrometer.

The hardness of the total construction is not compromised yet in this case, which make this structure suitable as a sealing layer with high oxygen barrier qualities in a conventional cap/neck of the bottle application.

The barrier improvement of such a construction compared to a monolayer of EVA of the same thickness is 400-fold.

An advantage of such a symmetrical structure further consists in that the slices must not be supplied in an oriented manner when assembling the cap.

A further increase of the oxygen barrier by making the EVOH-layer thicker has little use, however. The EVOH would make the film too rigid. Also, compensating by making the layer (A) thicker is pointless, as the EVOH layer (C) would be situated too far away from the neck of the bottle and the inflow of the oxygen from the outside to the inside through the EVA layer (A) and layer (B) would only increase.

Also the material cost would only increase with a marginal improvement of the oxygen barrier and less functionality.

Further, EVA is not a good moisture barrier compared to PE. For the same thickness, the moisture barrier of EVA is about 40 times less. This has an adverse effect on the EVOH, of which the oxygen barrier is known to decrease with a factor 10 in case of a high relative humidity.

A film structure with an EVA layer of ~300 micrometer, combined with an EVOH layer (C) of 100 micrometer provides an oxygen barrier of ~4.75 cc/m2/day at 400° C./90% relative humidity. This is very high. Such a construction is known under the name Tri-Shield™ from Tekni-Plex.

However, some applications require an even higher oxygen barrier.

The present invention provides a 20- to 30-fold improvement of the oxygen barrier compared to the known film structures with a high oxygen barrier that are fit for sealing bottles, including Tri-Shield™.

Other known flexible film structures made of synthetic material mainly consist of a foam layer that is provided between two outermost thin layers, whereby a gas barrier is provided on one of the outermost thin layers in the form of a multi-layered preformed foil that is impermeable, or practically impermeable, to gas, in particular to air or oxygen.

Such a multi-layered foil with oxygen barrier qualities is usually made of a polyethylene (PE) or polyamide layer; a binding layer; a layer with oxygen barrier qualities; and another binding layer and a polyethylene or polyamide layer.

The oxygen barrier layer is for example a polyvinylidene chloride (PVDC) or an ethyl vinyl alcohol (EVOH) layer. The above-mentioned thin multi-layered foils are known among others under the name. Saranex®. Thus, there is a Saranex foil on the market that is used for sealing bottles, whereby the foil has a thickness of 50 micron and is formed of a PE layer, a binding layer, a PVDC layer, a binding layer and a PE layer. This known foil forms an oxygen barrier of 8 cc/m2/day/atmosphere (ASTM D3985).

This type of foil can be added to the foamed structure by means of either a hot lamination process or a dry lamination process (dry bond lamination).

The oxygen barrier is improved in this case, but the oxygen barrier still does not provide a substantial improvement compared to the best embodiment of a Tri-Shield™.

A disadvantage is that adding such a multi-layered, preformed foil of the Saranex type or of other types, by means of an additional lamination process, only allows for the formation of an asymmetrical structure, since an additional lamination on the free side of the foam layer makes the production of the film considerably more complex and expensive.

Another disadvantage of adding the above-mentioned foil is that binding such foils to a foam layer or to an outermost layer, which are usually made of polyolefin chains, does not provide enough mechanical strength, as a result of which the obtained film structures are disadvantageous in that the different layers come off after a while, such that the film structure loses its impermeability to air.

In order to prevent the different layers from coming off the film structure, it is known to provide a binding layer between the layer forming the oxygen barrier and the outermost layer and the foam layer respectively.

A disadvantage of providing this binding layer is that the thickness of the film structure increases and that the distance between the outer surface of the film and the oxygen barrier is enlarged.

Indeed, when enlarging the distance between the oxygen barrier and the outer surface of the film, the risk that air can migrate through a diagonal side wall of a piece of film increases, which makes such a film little suitable for applications such as the airtight sealing of the opening of a container or the like.

The present invention aims to remedy one or several of the above-mentioned and other disadvantages.

To this end, the invention concerns a film structure which comprises at least five layers, in particular two outer layers made of a polyolefin, onto which is each time provided, on the opposed sides, a layer forming a gas barrier and whereby, between both above-mentioned gas barriers, is provided a layer of a foamed synthetic material, whereby the outer layers consist of a mixture of a polyolefin and a binder, which makes it possible to bond said polyolefin with the layer forming the gas barrier.

An advantage of a film structure according to the present invention is that its structure is not very complex on the one hand, and that it forms a superior gas barrier on the other hand.

Moreover, the orientation of the film as it is provided in the cap of a bottle is not crucial, since a gas barrier is provided against each of the outer layers of the film structure.

Another advantage is that the gas barrier is situated relatively close (for example less than 200 micrometer) to the outer surface of the film, as a result of which a gas flux through the diagonal side edges, for example between a gas barrier of the film and the edge of an opening to be sealed, is restricted to a minimum.

The film is preferably symmetrical, such that the film has the same gas barrier qualities in every direction, be it straight or upside down.

Further, the outer layers and the foam layer preferably consist of a mixture of a polyolefin and a binder which makes it possible to bind this polyolefin to the layer forming the gas barrier.

This preferred embodiment offers the advantage that it is no longer necessary to provide a separate binding layer between the outer layer and the gas barrier and between the gas barrier and the foam layer, such that the distance between the outer surface of the film and the gas barrier can be restricted.

The present invention also concerns a method for manufacturing the above-mentioned film structure according to the invention, which method mainly consists in manufacturing a film structure comprising at least five layers, two outer layers made of a polyolefin, on which is each time provided, on the opposite sides a layer forming a gas barrier, and whereby, between both above mentioned gas barriers is provided a layer made of a foamed synthetic material, characterised in that the base material for the outer layers and the foamed synthetic layer is mixed with binder which makes is possible to bond them with the above-mentioned layers forming a gas barrier, and in extruding the obtained mixture.

Another advantage of the present invention is that the film structure can be manufactured relatively cheaply compared to the existing film structures with a gas barrier, since the binding layer and the adjacent polyolefin layer are extruded together in a single layer, such that savings can be made on at least one additional extrusion unit that typically has to extrude the binding layer.

Further, this method also makes it possible to save on a more complicated and more expensive extrusion nozzle that is suitable for extruding multi-layered structures, whereby the binding layer must each time be provided as an intermediate layer between the polyolefin layer and the barrier layer and between the barrier layer and the foam layer.

Figure 2:
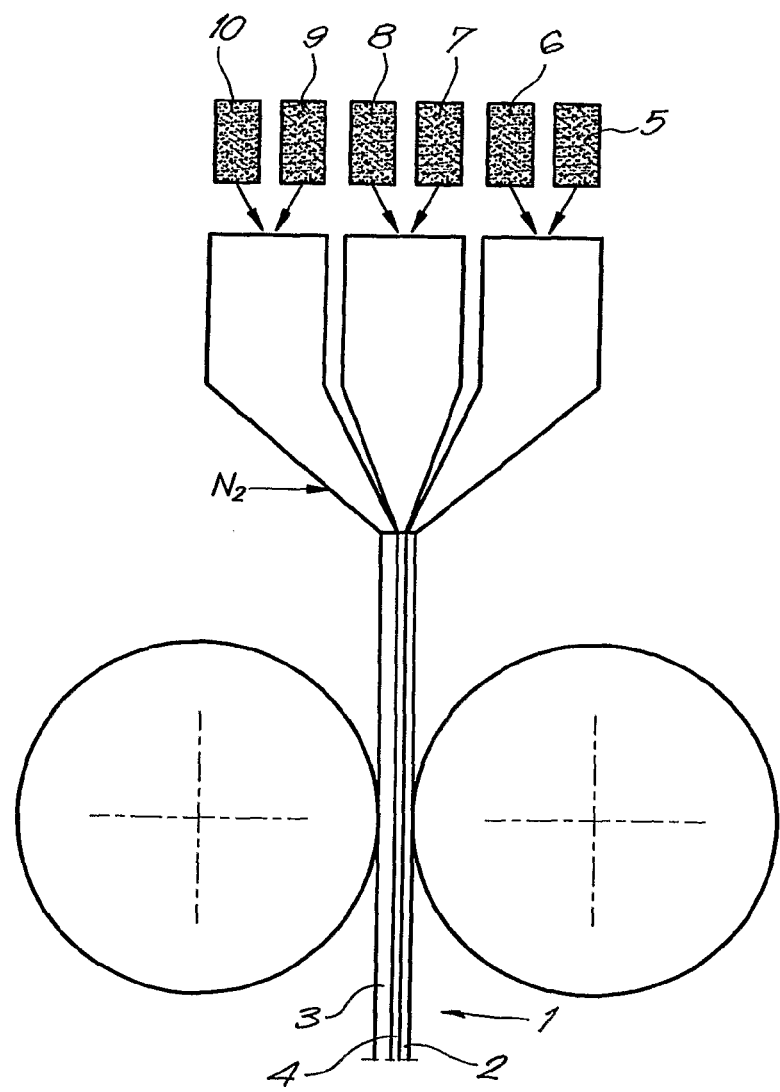
Figure 3:
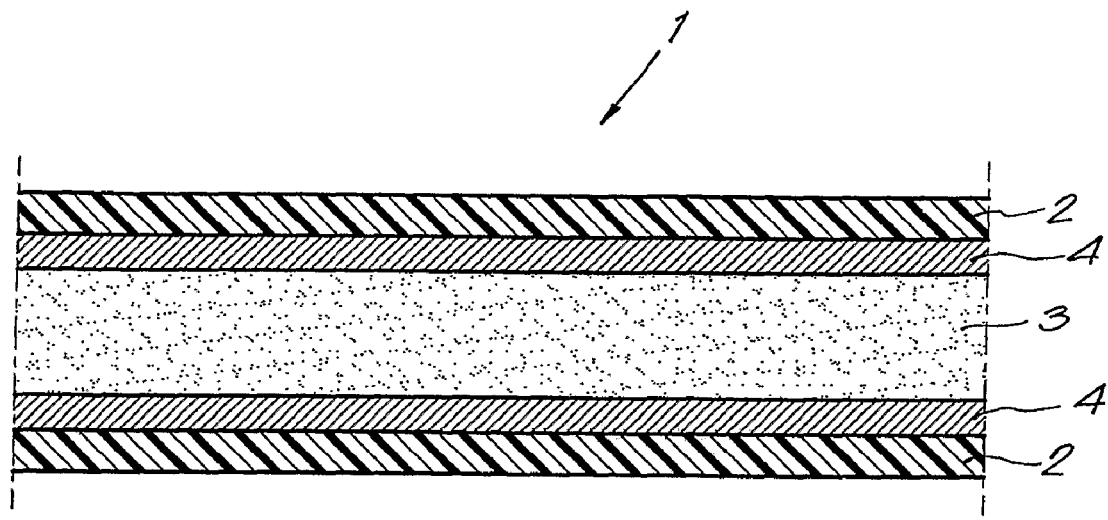
Figure 4:
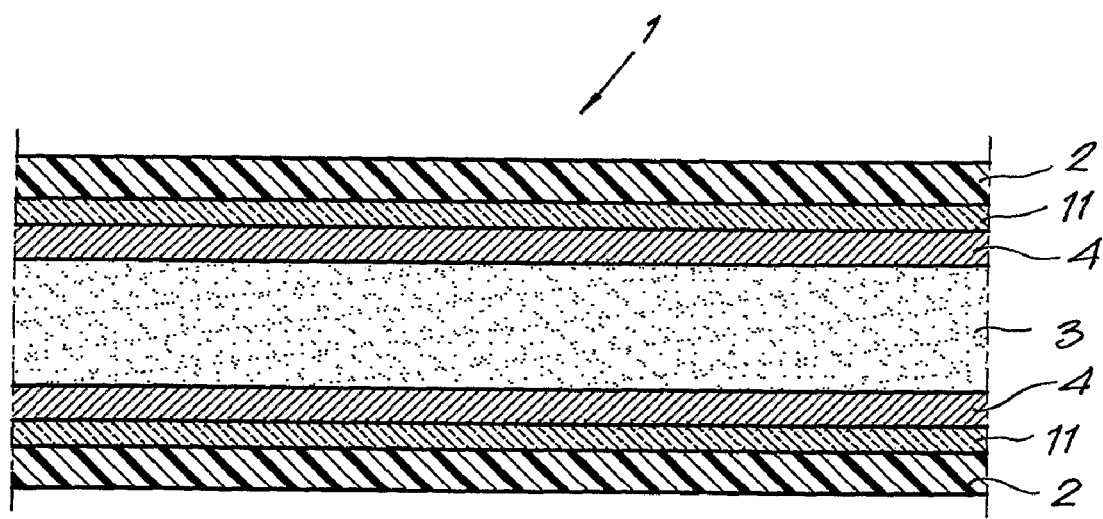

In order to better explain the characteristics of the present invention, the following preferred method according to the invention is given as an example only without being limitative in any way, as well as some preferred embodiments of a film structure according to the invention, with reference to the accompanying drawings, in which:

FIG. 1 represents a film structure according to the invention;

FIG. 2 schematically represents a method for manufacturing a film structure according to the invention;

FIGS. 3 and 4 represent variants of the film structure represented in FIG. 1.

FIG. 1 represents a film structure 1 which mainly consists of a layer 2 of polyolefin and a foam layer 3, whereby a layer 4 is provided between both above-mentioned layers 2 and 3 which forms a gas barrier, for example an oxygen barrier.

The above-mentioned polyolefin is preferably mainly made of a polyethylene (PE), since this synthetic material is considered as acceptable for applications in among others the food industry and the pharmaceutical industry.

Moreover, PE is an excellent moisture barrier which makes it possible to protect the gas barrier 4.

The layer 2 of polyolefin is designed as an outer layer which can come into contact with the content of a container or the like, formed by the film structure 1 or onto which the film structure 1 is provided as a sealing means.

According to the invention, an amount of binder is preferably mixed in the above-mentioned layers 2, and preferably also 3, enabling a good bond of this layer 2, and preferably 3, to the layer 4 which forms the gas barrier and which is preferably made of ethyl vinyl alcohol (EVOH).

The amount of binder in the layers 2, and preferably 3, depends on the required needs and the fitness of the binder in the layers concerned for the final application, i.e. the product to be packed. Also the bonding force between the layers 2 and 4 has an influence on the amount of binder to be used.

The amount of binder is selected such that as little binder as possible is used while all functional demands are nevertheless met.

A typical binder having a low concentration of functional groups is typically situated between 5 and 20 mass percent.

The binder preferably belongs to the family of extrudable binders on the basis of a polyolefin with built-in functional groups that provide for the necessary bond between polyolefins and dipolar substrates, such as EVOH, polyamide (PA) and the like.

Such extrudable binders are well known in the polymer industry under the names Lotader®, Admer®, Yparex®, Orevac®, etc.

The foam layer 3 preferably consists of a polyolefin such as, for example, a polyethylene with a low density (LDPE).

Finally, the layer 4 forming the gas barrier, preferably consists of an ethyl vinyl alcohol (EVOH) co-polymer that is extruded.

The ratio polyethylene/vinyl alcohol of the co-polymer and the thickness of the gas barrier may hereby be selected as a function of the suppleness and/or the impermeability to gas of the layer 4 concerned, whereby the following applies: the larger the above-mentioned ratio is selected, the suppler the layer 4 and the smaller the impermeability to gas will be.

A mixing ratio of for example 32/68 PE/VOH with a thickness of 50 micrometer per EVOH layer provides an oxygen barrier of on average 0.18 cc/m$^2$·day, at 40° C., 100% oxygen and 90% relative humidity. A mixing ratio of for example 44/56 PE/VOH with a thickness of 50 micrometer per EVOH layer provides an oxygen barrier of on average 0.45 cc/m$^2$·day, at 40° C., 100% oxygen and 90% relative humidity. This construction provides a suppler film. However, a mixing form of both EVOH in the form of 70% 32/68 PE/VOH, 30% 44/56 PE/VOH provides a relatively supple film with an excellent barrier of 0.22 cc cc/m$^2$·day, at 40° C., 100% oxygen and 90% relative humidity with a thickness of 50 micrometer.

It is clear that the thickness and composition of the different layers 2 to 4 can be selected as a function of the demands that are imposed on the film construction 1 to be made.

By varying the thickness and type of EVOH, a less supple or suppler film can be designed with specific barrier qualities, fit for the specific application of the client.

As an airtight sealing for a bottle opening, the outer layer 2 is preferably selected with a thickness included between 25 and 300 μm (micrometer), more specifically between 150 and 200 micrometer, whereas for the composition of the layer 4 forming the gas barrier, an EVOH co-polymer of circa 32 to 48 mole % polyethylene or a mixture of two EVOH co-polymers is preferably taken as a basis, whereby the mole % of both EVOH co-polymers is selected between circa 32 to 48 mole % polyethylene.

The thickness of the gas barrier can also be freely selected, but in the aforesaid case it will preferably be situated between 5 and 100 μm.

FIG. 2 schematically represents a method according to the invention for manufacturing the above-described film structure 1.

The above-mentioned method hereby starts with a mixing phase, whereby the different components, in particular a polyolefin 5 and a binder 6 are mixed in a desired ratio to manufacture an outer layer 2, whereby at least an EVOH co-polymer 7 and optionally a second EVOH co-polymer 8 are mixed in an appropriate ratio to manufacture the layer 4 forming the gas barrier and whereby a polyolefin 9 and a binder 10 are mixed to obtain the foam layer 3.

As soon as the above-mentioned mixtures have been prepared, they are extruded together in a co-extrusion process so as to form the desired, in this case three-layered film structure 1.

During the extrusion, nitrogen gas (N2) can be injected in the mixture which forms the foam layer 3 so as to make the layer 3 foam.

Of course, the layer 3 can also be made to foam in a chemical manner, for example by adding an amount of citric acid to the mixture concerned.

A preferred further embodiment of a film structure 1 according to the invention is represented in FIG. 3.

In FIG. 1, on the one hand, as mentioned above, the represented film structure 1 is composed of five layers, in particular two outer layers 2 that are either or not identical, whereby a layer 4 forming a gas barrier is each time provided on the opposite sides and whereby the above-mentioned foam layer 3 is provided between the gas barriers.

The advantage of the film structure 1 that is represented in FIG. 1 is that it is provided with a gas barrier on both sides and, as a consequence, must not be oriented before its application, such that, when such a film structure is used as an airtight sealing for containers, relatively much time and costs can be saved in comparison with the case where the film structure 1 must always be turned in the right direction.

It should be noted that, in order to make optimal use of the above-mentioned advantage, the film structure 1 is preferably made symmetrical.

FIG. 3, on the other hand, represents another embodiment of the film structure 1, whereby between the above-mentioned outer layers 2 and the gas barriers 4 has been provided an oxygen-binding layer 11.

Such an oxygen-binding layer 11 offers the additional advantage that air coming through the gas barrier is bonded by the oxygen-binding layer 11 and, as a consequence, does not penetrate any further through the film structure 1.

Moreover, when using this variant as an airtight sealing for containers, oxygen that may possibly enter the container while it is being sealed will automatically be removed by the oxygen-binding layer 11.

It is clear that in a further embodiment of the film structure 1 between the above-mentioned outer layers 2 and the gas barriers 4 and between the gas barriers 4 and the foam layer 3 may each time contain another binding layer.

This then provides a 9-layered film that is extruded in the conventional manner in the different layers, with the advantage however that it is again a symmetrical structure offering the advantage that it is provided with a gas barrier on both sides and consequently must not be oriented before its application, such that when using such a film structure as an airtight seal for containers, relatively much time and costs can be saved in comparison with the case where the film structure 1 must always be turned in the right direction.

The present invention is by no means restricted to the embodiments described above and represented in the drawings; on the contrary, such a method and film structure according to the invention can be made according to all sorts of variants while still remaining within the scope of the invention.

The invention claimed is:

1. A cap lined with a film structure for sealing a neck of a bottle, comprising:
   the cap; and
   the film structure comprising at least five layers:
   two outer layers (2) comprising a first polyolefin and a first binder on which is each time provided, on the opposite sides,
   a layer (4) comprising a gas barrier and whereby,
   between both above-mentioned gas barriers (4), is provided a layer (3) comprising a foamed synthetic material comprising a second polyolefin and a second binder,
   wherein the second polyolefin and second binder may be the same or different as the first polyolefin and first binder,
   wherein the first and second binders makes it possible to bond the outer layers (2) and the foam layer (3) to the layer (4) forming the gas barrier
   wherein the film structure is provided in the cap in the form of a slice.

2. A cap lined with the film structure according to claim 1, wherein no separate binding layer is provided between the different layers (2, 3, 4).

3. A cap lined with the film structure according to claim 1, wherein between the outer layers (2) and the layers (4) forming a gas barrier has been provided an oxygen-binding layer (11).

4. A cap lined with the film structure according to claim 1, wherein the layer (4) forming the gas barrier is made of an ethylene vinyl alcohol co-polymer (EVOH).

5. A cap lined with the film structure according to claim 1, wherein the above-mentioned layer (4) forming the gas barrier has a thickness ranging from 5 to 100 μm.

6. A cap lined with the film structure according to claim 1, wherein the film structure has sufficient flexibility, elasticity, and thickness so as to elastically deform under pressure.

7. A cap lined with the film structure according to claim 1, wherein the outer layers (2) each have a thickness ranging from 25 to 300 μm.

8. A cap lined with the film structure according to claim 1, wherein the outer layers (2) each have a thickness ranging from 150 to 200 μm.

9. A cap lined with the film structure according to claim 1, wherein the gas barrier layers (4) each have a thickness ranging from 5 to 100 μm.

10. A cap lined with the film structure according to claim 1, wherein the binder comprises a functionalized polyolefin.

11. A cap lined with the film structure according to claim 1, wherein the foamed synthetic material of the foam layer (3) comprises low density polyethylene.

* * * * *